Sept. 4, 1962  A. V. L. C. DEBRIE  3,052,157
DEVICE FOR APPLYING LIQUID TO A FILM IN PHOTOGRAPHIC APPARATUS
Filed Sept. 21, 1959
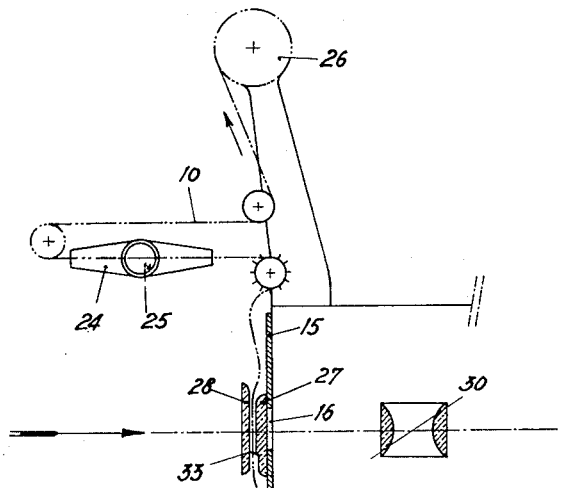
Fig. 1
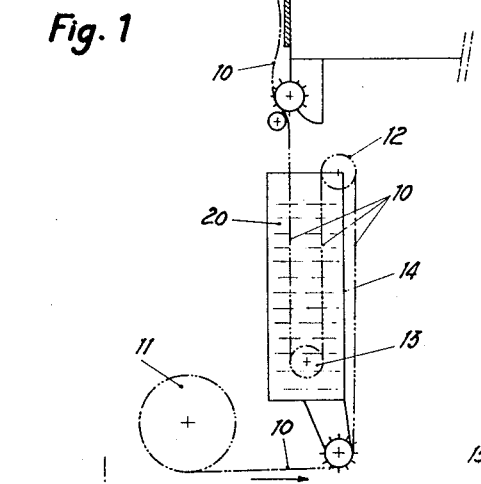
Fig. 2
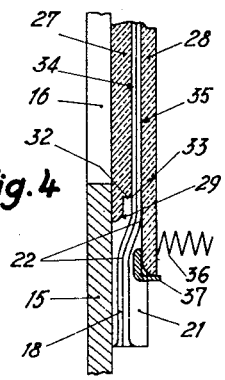
Fig. 4
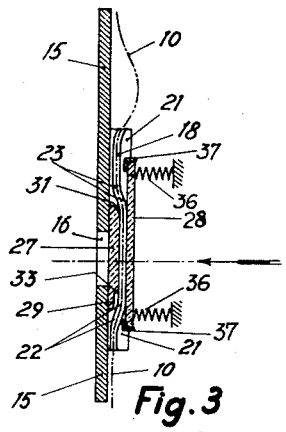
Fig. 3
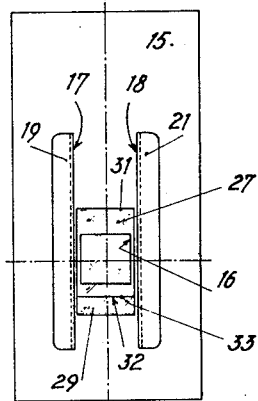

United States Patent Office 3,052,157
Patented Sept. 4, 1962

3,052,157
DEVICE FOR APPLYING LIQUID TO A FILM IN PHOTOGRAPHIC APPARATUS
André Victor Leon Clement Debrie, 111 Rue Saint Maur, Paris XIe, France
Filed Sept. 21, 1959, Ser. No. 841,290
Claims priority, application France Feb. 3, 1959
4 Claims. (Cl. 88—24)

The object of the present invention is an improved device by means of which, in an optical printing apparatus, the film to be copied is advanced between two sheets of liquid in the projection passage, in order to prevent by this method, which is known per se, the reproduction on the copy of defects which reproduce and even worsen the appearance of accidental scratches or other blemishes formed by hollows, either owing to the gelatine of the film or to the film support.

Devices exist which make use of the property conferred by the immersion of the film in a liquid having an index of refraction which is sufficiently close to that of the gelatine and of the support, such a liquid being constituted by triacetate of cellulose, for example, so as to virtually eliminate the effect of these surface blemishes.

When the light rays pass through, the scratches or other hollows in the surfaces of the film cause deviations in the light rays which traverse the said surfaces, at those points at which the surface of separation between the film and the air is not parallel to the general surface of the film, these deviations being represented by accidental lines or points which cause blemishes on the copied images.

In the device employed in the case of continuous printing apparatus for sound-tracks in particular, the passage-way in front of the printing window is provided with two transparent optical sheets leaving between each other an interval which is greater than the thickness of the film. Between each sheet and the surface of the film, before the image window, the liquid of suitable index is injected under pressure and, under the effect of this pressure, comes out through the sides and through the extremities of the passage-way while at the same time, the parts of this liquid which circulate between the sheets and the film hold this latter centered in position, in depth, between these sheets, by means of two layers of liquid.

The pressure is also necessary in order to prevent the film from varying in air when arriving in the dry state in the passage-way, as this would cause the liberation of bubbles in front of the image window, thus producing defects on the copy which are even more serious than those due to the effects of fine scratches which it is desired to counteract. The film is subsequently dried by jets of air which remove the excess liquid from it, and by passing the film through a device of known type for sucking out vapor and drying the film.

A device of this type necessitates means of circulation of the liquid under pressure and results in leaks and projections of this liquid the whole way round the passage.

This drawback is all the more troublesome since the liquid which is usually employed, which is a mixture of halogenated hydrocarbons and toluene, dissolves the lubricants and necessitates special protection of the mechanism for advancing the film.

The device of the present invention enables the passage of the film to be correctly guided in depth and accompanied by two uniform sheets of the liquid which is carried simply by its adhesion on the film along a certain path, at which point the film is already wetted before reaching the passage, thus preventing air from being carried in. The stoppage of bubbles which could nevertheless remain in the liquid is ensured, before the film passes in front of the image window, by a characteristic arrangement of the surface of at least one of the optical sheets and by the combination of these optical sheets with a V-shaped guiding passageway with lateral grooves provided with double curves before and after the image window.

The device of the present invention consists especially of a tank containing the liquid having a suitable index of refraction, the said tank being open at its top portion and placed beneath and at a sufficiently small distance from the passage-way for guiding the film in front of the image window, this passage-way being of known type in which the film is applied on its guided sections in lateral grooves having a V-section, one of these grooves being constantly returned elastically towards the other, the distance at which the two grooves are brought together being limited to the width of the film by the passage of this latter in those portions located before and after the image window, and in which the grooves are provided, in projection on a plane parallel to the plane of symmetry of the film in its passage corresponding to the said image window, with curved portions which are connected tangentially to each other and to the straight portions of the groove, these curved portions having fairly small radii and in opposite direction of curvature to the following curved portion. Owing to these curved portions and cylindrical portions which frame the image window, the film plays the part of rigid cross-members between these portions, in accordance with the known property of this type of passage-way, and the guiding is carried out perfectly both laterally and in depth without rubbing the surface of the film.

In accordance with the features of the present invention, the film which is soaked in the tank and carries away a layer of liquid on each of its two faces, passes between two mirrors or optical sheets of glass, arranged at the height of the image window, with their internal faces spaced during normal operation, on each side of the plane which passes in this portion through the straight portions which form the trough of the V-shaped grooves, at least one of the said mirrors being firmly held in position by elastic means which enable the mirror to be temporarily displaced during the passage of the overthickness of a glued section connecting two lengths of film.

Since the film is well guided in the channel with V-shaped grooves, the space between the faces of the mirrors can be reduced to a minimum, thus leaving small thicknesses for the sheets of liquid on each face of the film.

The quantity of liquid carried away between the faces of glass and those of the film is thus very small from the time of its entrance between the mirrors, which should preferably be provided with rounded extremities and thus forming a section which diminishes in the shape of a funnel.

On the other hand, the very important problem of elimination of residual bubbles from the liquid carried away by the film, in spite of the absence of any form of pressure feed, is solved by providing at least one of the mirrors with a sharp shoulder, before the level of the image window, this shoulder having the effect of reducing the thickness of the liquid layer which is being carried away, due to a sudden reduction of the thickness of the passage-way, thus causing the bursting and the elimination of the bubbles which might still remain in the layer of liquid which, after leaving the tank, is still carried along by the wetted film.

This shoulder need only be formed on the mirror, on the plane surface of which the film comes in and goes out, in the central portion of the passage-way, by means of a curve which is made concave towards this plane surface corresponding to the path of travel in front of the image window (see FIG. 4). On the other side, the effect of the convex curve, which precedes the passage against the mirror can suffice, on account of its convexity, to burst the said bubbles and it is usually possible to limit the use of this shoulder to the other sheet.

After passing out of the passage-way, the film passes into a drying device of known type, in which the faces of the film are swept by incoming currents of air which are however evacuated by suction when charged with vapors of the evaporated liquid. The said drying device can be accompanied or not by heating by means of an electrical resistance so as to activate this evaporation of the liquid, which can even be at least partially recovered by condensation in a known manner.

The accompanying drawings show by way of example only and not in any sense by way of implied limitation, and in very diagrammatical manner, the incorporation of the device in accordance with this invention in an existing type of optical printing apparatus.

In these figures:

FIG. 1 is a general diagram of a form of embodiment of the invention, looking in lateral cross-sectional elevation;

FIG. 2 is a view in elevation, in the direction of the path of the light preceding the lens of the optical printing apparatus, the first parallel sheet of the passage-way having been removed as well as the film;

FIG. 3 is a transverse cross-sectional elevation through the optical axis corresponding to FIG. 2; and FIG. 4 is a partial cross-section, on a larger scale, corresponding to the bottom of FIG. 3.

In these figures, the same parts have been given the same reference numbers.

In FIG. 1, the film 10 released by the unwinding spool 11 is driven by usual means not shown in the drawings.

The said film 10, which is guided by rollers 12 and 13, passes through and is immersed in, a tank 14 containing the liquid 20 having a suitable index of refraction in the vicinity of 1.5, for example, and the film passes out of the tank after being wetted and covered with the liquid which is carried away with it so as to pass into the projection passage-way beneath which the tank 14 is placed.

This passage-way is constituted, in its known portion, by the contact-plate 15 in which the image window or projection window 16 is pierced at right angles to the optical axis of the lens 30 of the printing apparatus, and by V-shaped grooves 17 and 18 hollowed out respectively in the bars 19 and 21 framing the window 16.

The bar 19, for example, is fixed on the contact-plate 15 and the bar 21 is fixed on this contact-plate and while remaining parallel to this latter, is capable of being displaced by the usual means of guiding and elastic return, such means not being shown.

The V-shaped grooves, 17 and 18 are provided with double curves 22 and 22' and 23 and 23' respectively, and are symmetrical with each other with respect to the vertical plane of symmetry of the film 10, parallel to the grooves and to the path of travel of the film in the passage-way and at right angles to the window 16.

After leaving the passage-way, the film passes through a drier 24 of known type, in which the liquid is vaporized and sucked through a suction tube which comes in laterally at 25.

The film 10 will then be rewound in a dry state on the receiving reel 26 of the printing apparatus. In the space between the lateral bars 19 and 21 of the V-shaped passage-way are fixed glass sheets 27 and 28 having parallel faces and ground to optical finish.

The sheet 27 is fixed between the contact-plate 15, which is pierced with the window 16, and the plane which passes along the straight bottom of the V-shaped grooves in front of this window, at a distance from this plane which is equal to the half-thickness of the film increased by the thickness of the liquid to be retained on this face of the film.

The said sheet 27, is arranged in the case shown, in the generally concave portion between the sections connecting the curves 22 and 23 to the V-shaped grooves, in their vertical path of travel in front of the window 16. The said sheet is provided at its transverse extremities with cylindrical horizontal rounded portions 29 and 31 respectively so as to come progressively into contact with the liquid on the film. Above the transverse extremity 29 and beneath the window 16, the rounded portion 29 comes up against a transverse shoulder 32 provided with a ridge 33 corresponding to a solid dihedron of approximately 90°, at its intersection with the flat face 34 of the sheet 27 which assumes its full thickness starting from that point. This ridge need not, however, be a pure intersection but can be formed by a very light chamfer or by a rounded portion having a very small diameter which does not in practice deprive it of the properties of a ridge.

This ridge 33 can be horizontal or can on the contrary be sloping with respect to the transverse direction of the film but while always remaining along its entire length at a lower level than that of the base of the window 16.

It is this ridge 33 which plays the very important part of causing the residual air bubbles to burst and of eliminating these bubbles from the liquid before it is carried away between the film and the surface 34.

The sheet 28, which is shown in FIGS. 1, 3, and 4 and not shown in FIG. 2 so as not to conceal the other portions, overlaps at the top and at the bottom of the sheet 27 and on the portions of the passage-way having a double curve. The possibility for this sheet 28, of being displaced elastically when a glued section of film passes, is shown diagrammatically in FIGS. 3 and 4, by the presence of the springs 36 and of the stops 37 which serve to re-establish the normal distance between the film and the sheet 28 after each passage of an overthickness of the film.

The said sheet 28 does not in this case comprise a shoulder, since the convexity of the film corresponding to that of the groove at 22, generally suffices to burst the bubbles before the passage of the liquid which is carried away between the film and the face 35 of the sheet 28.

The excess liquid retained at 33 and at 22 falls down again along the film and can be collected in the tank 14.

Since there is no pressure, there is no splashing or resulting need for protection requiring modifications of the printing apparatus, and the losses of liquid are limited.

What I claim is:

1. In a film projector, in combination, a gate having an image window; means for advancing a film strip along a predetermined path through said gate and past said image window so that the central plane of the film is located in said path; an arrangement for applying a relatively thick coating of liquid to at least one face of the film strip in advance of said gate; and equalizing means located between said arrangement and said gate adjacent to said path and extending transverse to the direction of and at a distance from said path equal to half the thickness of the film strip plus the thickness of the final coating of liquid to be retained on said one face of the film strip which thickness is less than the thickness of the coating applied by said arrangement to said one face, whereby air bubbles, if any, in the applied coating of liquid, together with excess liquid, are removed by said equalizing means and a final coating of liquid of uniform thickness is obtained before the film strip reaches said image window.

2. In a film projector, in combination, a gate having an image window; means for advancing a film strip along a predetermined path through said gate and past said image window so that the central plane of the film is located in said path, that one face of the film strip is turned toward and that the other face of the film strip is turned away from said image window during the passage of the film strip through said gate; an arrangement for applying a relatively thick coating of liquid to both faces of the film strip in advance of said gate, said arrangement comprising a liquid-containing tank and means for guiding the film strip through the liquid contained in said tank; and equalizing means located between said tank and said gate adjacent to said path and extending transverse to the direction of and at a distance from said path equal to half the thickness of the film strip plus the thickness of the final coating of liquid to be retained on said one face of the film strip which thickness is less than the thickness of coating applied by said arrangement to said one face, whereby air bubbles, if any, in the applied coating of liquid, together with excess liquid, are removed by said equalizing means and a final coating of liquid of uniform thickness is obtained before the film strip reaches said image window.

3. A combination as set forth in claim 2, wherein said gate has substantially V-shaped undulate grooves receiving the lateral edge portions of the film strip so that the film strip assumes an undulate shape while passing through said gate.

4. A combination as set forth in claim 2, further comprising dryer means located past said gate for evaporating the liquid coat from the film strip so that the condition of the film strip is the same in advance of said tank and past said dryer means.

References Cited in the file of this patent

UNITED STATES PATENTS

| | | |
|---|---|---|
| 1,208,664 | Russak et al. | Dec. 12, 1916 |
| 1,669,394 | Ellis et al. | May 8, 1928 |
| 1,816,409 | Steele | July 28, 1931 |
| 1,933,783 | Wittel | Nov. 7, 1933 |
| 2,259,009 | Talbot | Oct. 14, 1941 |
| 2,303,633 | Guercio | Dec. 1, 1942 |
| 2,446,668 | Tuttle et al. | Aug. 10, 1948 |
| 2,855,822 | Fitter et al. | Oct. 14, 1958 |
| 2,995,977 | Imus et al. | Aug. 15, 1961 |

FOREIGN PATENTS

| | | |
|---|---|---|
| 69,210 | Austria | June 25, 1915 |

OTHER REFERENCES

"Society of Motion Picture Engineers Transactions," No. 5, May 3, 1926, pages 49–55.